Oct. 14, 1969  S. A. R. RIGDEN ET AL  3,473,071

ELECTRIC DISCHARGE LAMPS

Filed Oct. 19, 1966

INVENTORS
SYDNEY ALFRED RICHARD RIGDEN
JOHN BRIAN WHISCOMBE
BY
Kinchtein, Kinchtein & Ottinger
ATTORNEYS

# United States Patent Office 3,473,071
Patented Oct. 14, 1969

3,473,071
ELECTRIC DISCHARGE LAMPS
Sydney Alfred Richard Rigden, Bushey Heath, and John Brian Whiscombe, Ealing, London, England, assignors to The General Electric Company Limited, London, England, a British company
Filed Oct. 19, 1966, Ser. No. 587,884
Claims priority, application Great Britain, Oct. 25, 1965, 45,091/65
Int. Cl. H01j 17/16, 61/30
U.S. Cl. 313—220          7 Claims

ABSTRACT OF THE DISCLOSURE

In an electric discharge lamp comprising a discharge envelope formed of light-transmissive alumina with niobium members closing the apertures in the envelope, one of which members carries an exhaust stem, the exhaust stem is formed of one of, or an alloy of, the metals titanium, zirconium, vanadium, tantalum, niobium, and is sealed to the exterior of the closure member, either directly to the niobium or to an intermediate member which is preferably of molybdenum or tungsten, by means of an alloy of one or more of the metals zirconium, vanadium, titanium, with the metal of the stem.

BACKGROUND OF THE INVENTION

Field of the invention

This invention relates to electric discharge lamps having discharge envelopes formed of light-transmissive, high alumina content material, that is to say material having an alumina content exceeding 85% by weight.

DESCRIPTION OF THE PRIOR ART

It has been proposed to employ high alumina content materials for the construction of the discharge envelopes of some metal vapour electric discharge lamps, that is to say lamps having an envelope filling including at least one metal. A particularly suitable material for this purpose is polycrystalline ceramic material formed by pressing and sintering finely divided alumina, possibly with the addition of up to 1% by weight of one or more other refractory oxides such as magnesia. Such high alumina content material is especially advantageous for forming the discharge envelopes of alkali metal vapour electric discharges lamps, since this material is highly resistant to attack by hot alkali metal vapour.

Discharge lamp envelopes of high alumina content material are usually of tubular form, the ends of the tubes being closed by suitable closure members, such as caps or plugs, formed of a material which is resistant to attack by the metal vapour of the lamp filling. The closure members are sealed to the alumina tube and carry the electrodes between which the discharge passes in operation of the lamp; in addition, an exhaust stem through which evacuation of the envelope and introduction of the filling can be effected, in manufacture of the lamp, is sealed through or carried by at least one of the closure members.

One particularly suitable form of closure member which it has been proposed to employ in alkali metal vapour discharge lamps having envelopes of high alumina content material comprises a cap or plug of niobium: niobium is advantageous for this purpose since it is resistant to alkali metal vapour attack and its coefficient of thermal expansion closely matches that of the high alumina content material. Niobium closure members can be sealed to the alumina tube by means of a layer of glass having a coefficient of thermal expansion substantially matching that of the niobium and the tube material, as described in British patent specification No. 961,070, or by means of a sealing layer consisting of one or more of the metals titanium, zirconium, vanadium, hafnium. The exhaust stems which it has been proposed to employ in the niobium-capped lamps described in the above-mentioned specifications are either formed of niobium and are sealed directly to the niobium closure member by means of a glass of matching thermal expansion characteristics, or are formed of stainless steel or a suitable iron-nickel-cobalt alloy and are joined to the niobium closure member by means of one or more intermediate members, for example of nickel and/or molybdenum, the various metal members being sealed together by suitable brazing techniques. Thus, for example, in one particular arrangement an exhaust tube of stainless steel or iron-nickel-cobalt alloy is brazed, by means of a palladium-nickel brazing alloy, to a molybdenum rod which extends through and is brazed to the niobium cap. However, we have found that the brazed junctions between this form of exhaust tube and an intermediate member of a metal such as molybdenum sometimes have a tendency to fail at the high temperatures to which they are subjected in operation of the lamps, and it is one object of the present invention to provide an improved form of lamp in which this difficulty is reduced or overcome.

SUMMARY OF THE INVENTION

According to the invention, in an electric discharge lamp comprising a discharge envelope formed of light-transmissive, high alumina content material as hereinbefore defined and, closing the or each aperture in said envelope, a niobium closure member sealed to the envelope, at least one of which closure members has an aperture and carries an exhaust stem cooperating with said aperture, the or each exhaust stem is formed of one of the metals titanium, zirconium, vanadium, tantalum, niobium, or of a ductile alloy of two or more of these metals, and is sealed either to the niobium closure member or to an intermediate member formed of a suitable refractory metal or alloy by means of a sealing layer consisting of one or more of the metals zirconium, vanadium, titanium, alloyed with the metal of the exhaust stem.

A suitable refractory metal or alloy for use for the intermediate member referred to in the preceding paragraph is a refractory metal or alloy having thermal expansion characteristics enabling it to form a substantially matching seal with the niobium closure member and with the metal of the exhaust stem: suitable metals are, for example, tungsten and molybdenum.

Preferably, however, the exhaust stem extends through the aperture in the closure member and is sealed directly to the closure member, the exhaust stem being suitably shaped for example by the provision of a shoulder, so that a part thereof abuts a surface of the closure member.

Preferably the exhaust stem is formed of titanium or niobium; when the stem is of titanium, the sealing layer suitably consists of zirconium and vanadium alloyed with the titanium of the stem, and in the case of a niobium stem the sealing layer is preferably titanium alloyed with the niobium of the stem. Thus a titanium exhaust stem can be sealed to an intermediate member of molybdenum or tungsten by interposing a layer of zirconium and vanadium, either in the form of separate thin shims of the two metals or in the form of a single shim composed of an alloy of the two metals, between a part of the exhaust stem and an adjacent part of the intermediate member, and heating the assembly in an inert atmosphere or in vacuum to a temperature sufficiently high to cause the shim or shims to melt and alloy with the titanium of the exhaust stem, and to cause the alloy thus formed to bond to the metal of the intermediate member, the latter member also being brazed to the niobium closure member. Alternatively, and preferably, the titanium exhaust stem can be arranged to extend through an aperture in the niobium closure member, and a part of the exhaust stem can be sealed directly to the closure member by means of zirconium-vanadium shim or shims, in the same manner. Similarly, a niobium exhaust stem can be sealed either directly to the niobium closure member, or to an intermediate member of molybdenum or tungsten, by interposing a thin shim of titanium between a part of the exhaust stem and an adjacent part of the closure member or the intermediate member as the case may be, and heating the assembly in a suitable manner.

An electric discharge lamp in accordance with the invention usually has a tubular discharge envelope closed at each end by a niobium closure member carrying a tungsten electrode, with an exhaust stem provided at one end only. The niobium closure members may be in the form of caps, or plugs, or hollow cylinders, and are preferably sealed to the envelope by means of sealing layers comprising zirconium, vanadium and titanium.

The tungsten electrode carried by the closure member to which the exhaust stem is attached may be supported by the inner end of the aforesaid intermediate member, which extends through an aperture in the closure member. Alternatively, where the exhaust stem itself extends through, and is sealed directly to, the closure member, the said electrode may be brazed directly to the inner end of the exhaust stem, again by an interposed layer composed of zirconium and/or vanadium and/or titanium, preferably of zirconium and vanadium where the exhaust stem is of titanium, or of titanium where the exhaust stem is of niobium.

The invention is especially, although not exclusively, concerned with alkali metal vapour electric discharge lamps, since the form of exhaust stem described, and the metallic seals formed between such exhaust stem and the niobium closure member or an intermediate member, in accordance with the invention, are resistant to attack by hot alkali metal vapour, and are also unaffected by temperature cycling occurring as a result of intermittent operation of the lamp.

DESCRIPTION OF THE FIGURES

Two specific embodiments of the invention will now be described by way of example, with reference to the accompanying diagrammatic drawings, in which.

PREFERRED EMBODIMENTS OF THE INVENTION

Figure 1:
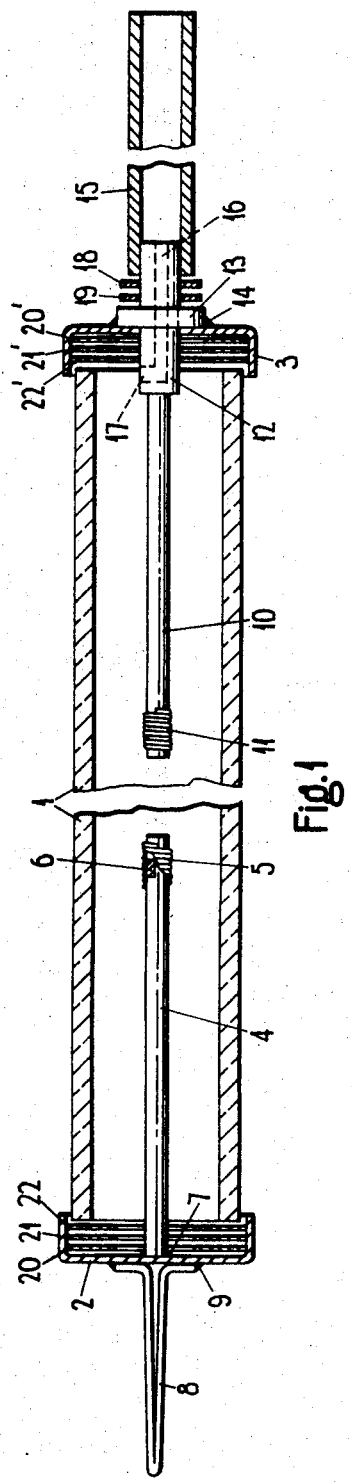
FIGURE 1 shows a sodium vapour electric discharge lamp, in part-sectional elevation and illustrates one method by which an exhaust stem in accordance with the invention is attached to a closure member at one end of the discharge envelope.

The lamp shown in FIGURE 1 comprises a discharge envelope 1, in the form of a straight tube, for example 120 millimetres long and having an internal diameter of 6 millimetres, formed of sintered polycrystalline alumina containing 1% by weight of magnesium oxide, closed at each end by a niobium end cap 2, 3, the caps being sealed to the ends of the alumina tube by means of a zirconium-vanadium-titanium sealing layer to be described in greater detail below.

An electrode in the form of a silicated tungsten rod 4, 2 cm. long and 1 mm. in diameter, on which is wound a coil of tungsten wire 5, retaining a quantity of activating material 6, is brazed to the niobium end cap 2 by means of titanium 7, so as to be supported coaxially within the envelope 1. A niobium tag 8 is brazed to the exterior of the niobium cap 2, also by means of titanium 9.

The second electrode is supported by the other niobium end cap 3, and consists of a similar silicated tungsten rod 10, 1.7 cm. long, overwound with a coil of tungsten wire 11; this electrode is welded to a molybdenum rod 12, which extends through an aperture in the centre of the niobium cap 3 and widens to form a shoulder 13, which is brazed to the exterior of the cap 3 with titanium 14. An exhaust stem 15, formed of titanium, is fitted over the external end of the molydenum rod 12 and is sealed to the shoulder 13 in a manner to be described in detail below. The molybdenum rod 12 has a duct 16 extending through it from the outer end and terminating at the side of the rod within the envelope, at 17, to provide a communicating channel between the exhaust stem 15 and the interior of the envelope 1.

In manufacturing a lamp of the form described above with reference to FIGURE 1, the end cap-electrode assemblies are first completed as described, with the exception of the attachment of the exhaust tube 15, the titanium brazes being carried out in vacuum or in an inert atmosphere. The exhaust stem 15 is then sealed to the molybdenum rod 12: two washers 18 and 19, respectively consisting of zirconium 0.004 inch thick and vanadium 0.002 inch thick, of internal diameter such that they fit closely around the rod 12 and of external diameter slightly less than the diameter of the shoulder 13, are slipped over the outer end of the rod 12 so as to lie on the shoulder 13 (which has already been brazed to the niobium end cap 3), the exhaust tube 15 is placed in position over the end of the rod 12, and the assembly is supported so that the tube 15 is disposed vertically and is heated in vacuum or in argon to a temperature of 1450° C. to 1500° C. while pressure is applied to the upper end of the tube 15. In the drawing this assembly is shown as it is immediately prior to the sealing operation, so that the individual washers 18 and 19 can be clearly seen. On completion of this sealing operation, the tube 15 is sealed by pinching and welding the open end thereof.

To complete the construction of the lamp, three metal sealing washers are placed within each of the niobium end caps, as also shown in the drawing prior to completion of the seals: the washers 20 and 20' are of zirconium and are 0.004 inch thick, the washers 21 and 21' are of vanadium of thickness 0.0015 inch, the washers 22 and 22' are of titanium 0.002 inch thick, and all the washers have internal and external diameters of 4 mm. and 8 mm. respectively. The end cap assemblies, with these washers, are then supported in position over the ends of the alumina tube 1, as shown, and the whole assembly is heated in vacuum to 1400° C.±50° C. while pressure is applied to the end caps by supporting the assembly vertically with a weight of 2 kgms. on the upper end cap: the end caps are thus sealed to the tube 1 while at the same time the envelope is exhausted.

The titanium exhaust stem 15 is reopened by breaking off the outer end, this stem is employed for the final exhaustion of the lamp and for the introduction of a filling of sodium and rare gas, for example argon at a pressure of about 20 millimetres of mercury, and the tube 15 is finally sealed off by pinching and welding.

The completed lamp is mounted coaxially within a cylindrical glass outer jacket designed to maintain the discharge envelope at a suitably high operating temperature when the lamp is in use, electric current supply leads being connected to the electrodes by being attached to the niobium tag 8 and the titanium stem 15 respectively. The leads and the outer jacket, and the means for supporting the lamp within the outer jacket, have been omitted from the drawing for simplicity, since these are all of well known form.

Figure 2:
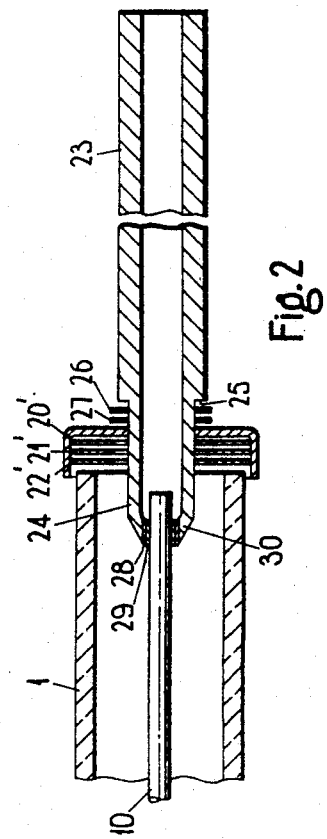
FIGURE 2 is a part-sectional elevation of one end of a similar lamp, showing a second method of attaching the exhaust stem to the closure member.

Referring now to FIGURE 2 of the drawings, in which parts which are similar to parts also shown in FIGURE 1 are indicated by the same reference numerals as those used in FIGURE 1, only that end of the lamp to which the exhaust stem is attached is shown, since the remainder of the lamp is identical in form to the lamp shown in FIGURE 1. In this case the titanium exhaust stem consists of a thick-walled tube 23 with a thin-walled portion 24, which extends through and fits closely within the aperture in the niobium end cap 3, a shoulder 25 being formed between the thick-walled and thin-walled portions of the said tube. The titanium shoulder 25 is sealed to the niobium cap 3 by means of annular shims 26 and 27, of zirconium and vanadium, 0.004 inch and 0.002 inch thick, respectively, in the manner described above with reference to FIGURE 1, in connection with the sealing of the tube 15 to the molybdenum shoulder 13.

The thin-walled portion of the titanium tube 24, extends within the enevelope 1 and provides the support for the electrode, of which only the tungsten rod 10 is shown in FIGURE 2: the tube 24 is brazed to the rod 10 by means of zirconium and vanadium strips 28 and 29, approximately 2 mm. long and 1 mm. wide and 0.004 inch and 0.002 inch thick respectively, the strips being spot welded to the rod and the end of the tube 24 being pinched over them, at 30, prior to heating the assembly. The pinching of the end of the tube 24 is effected in such a way that parts of the tube are brazed to opposite sides of the rod 10, as shown, while the remainder of the pinched tubing is spaced from the rod to provide ducts allowing communication between the exhaust tube 23, 24, and the interior of the envelope 1 (these ducts are not shown in the drawing).

In manufacturing a lamp of the form shown in FIGURE 2, the exhaust tube is first pinched and brazed on to the electrode rod 10 in the manner described above, this assembly being heated to 1450° C. to 1500° C. in vacuum or in argon. The seal between the cap 3 and the shoulder 25 of the titanium tube 23, 24 is then formed by a similar heating procedure, with the assembly supported vertically and with the application of pressure to the open end of the tube 23. Alternatively, both of these brazing operations can be carried out simultaneously. The manufacture of the lamp is then completed as described above with reference to FIGURE 1, the niobium cap 3 being sealed to the end of the envelope 1 by means of washers of zirconium, vanadium and titanium as before.

The embodiments described in the above specific examples with reference to the drawings may be modified by substituting, in each case, a niobium exhaust stem for the titanium exhaust stem referred to; when a niobium stem is employed, the pairs of shims 18, 19 (FIGURE 1) and 26, 27 and 28, 29 (FIGURE 2) are each replaced by a single thin shim of titanium.

In a further modification of the embodiment shown in FIGURE 2, the inner end of the exhaust tube 24, whether formed of titanium or niobium, can be pinched into an annular recess in the electrode rod 10, the pinched portion of the tube being brazed to the electrode within the recess.

We claim:

1. An electric discharge lamp comprising a discharge envelope formed of light-transmissive material having an alumina content exceeding 85% by weight, and having at least one aperture closed by means of a closure assembly comprising a niobium closure member which is sealed to the said envelope, said member having an aperture, at least one of which closure assemblies includes an exhaust stem cooperating with said aperture in the niobium closure member, said lamp being characterized in that the said exhaust stem is constituted of at least one metal which is a member of the group consisting of titanium, zirconium, vanadium, tantalum and niobium, and in that, for attachment of the exhaust stem to the niobium closure member, means is included to seal the exhaust stem to an adjacent refractory metal part of the closure assembly, which part is located on the exterior surface of the closure member, said means constituting a sealing layer composed of an alloy consisting only of the metal of the exhaust stem and at least one member of the group consisting of zirconium, vanadium and titanium.

2. A lamp according to claim 1, wherein the discharge envelope is tubular and is formed of a material consisting of at least 99% sintered polycrystalline alumina and not more than 1% of other refractory oxides, and contains an alkali metal filling, and wherein each end of the tubular envelope is closed by means of a closure assembly comprising a niobium closure member which is sealed to the adjacent end of the envelope, one of said closure assemblies including a said exhaust stem, and each of said closure assemblies supports an electrode coaxially within the envelope.

3. A lamp according to claim 1, wherein the said exhaust stem is formed of titanium, and the said sealing layer consists of zirconium and vanadium alloyed with the titanium of the stem.

4. A lamp according to claim 1, wherein the said exhaust stem is formed of niobium, and the said sealing layer consists of titanium alloyed with the niobium of the stem.

5. A lamp according to claim 2, wherein the said exhaust stem extends through the aperture in the niobium closure member and supports an electrode coaxially within the envelope, and wherein the exhaust stem is so shaped that a part of said stem abuts against the external surface of the closure member, the said part of the stem being sealed directly to the said surface of the closure member by means of a said sealing layer.

6. A lamp according to claim 2, wherein the closure assembly includes an intermediate member which extends from the exterior of the niobium closure member, through the aperture in said closure member, and into the interior of the envelope, which supports an electrode coaxially within the envelope, and to which both the exhaust stem and the niobium closure member are sealed, said intermediate member being formed of refractory metal having thermal expansion characteristics enabling it to form substantially matching seals respectively with the metal of the exhaust stem and with the niobium of the closure member, and being so shaped that a part thereof abuts against the external surface of the closure member, and the exhaust stem being sealed to the said part of the intermediate member by means of a said sealing layer.

7. A lamp according to claim 6, wherein the said intermediate member is formed of a metal which is a member of the group consisting of tungsten and molybdenum.

References Cited

UNITED STATES PATENTS

| | | | |
|---|---|---|---|
| 1,042,565 | 10/1912 | Kroner | 220—2.2 X |
| 2,672,414 | 3/1954 | Phillips et al. | 75—124 |
| 2,760,310 | 8/1956 | Nelson et al. | 287—189.365 X |
| 2,857,663 | 10/1958 | Beggs | 29—473.1 |
| 3,243,635 | 3/1966 | Louden et al. | 313—220 X |

JAMES W. LAWRENCE, Primary Examiner

R. F. HOSSFELD, Assistant Examiner

U.S. Cl. X.R.

174—17.05, 50.52, 50.61; 220—2.2; 313—284